United States Patent Office 3,446,091
Patented May 27, 1969

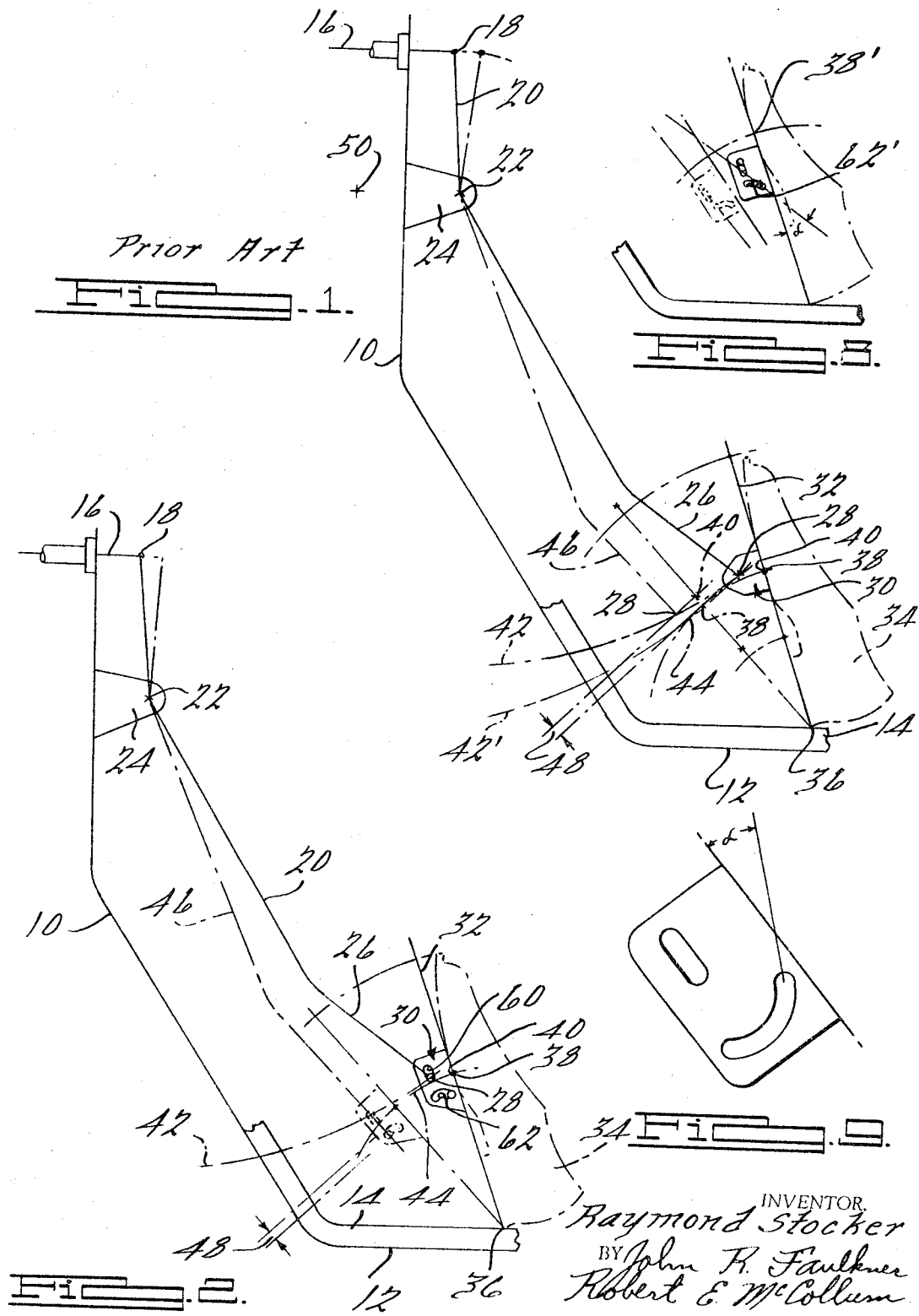

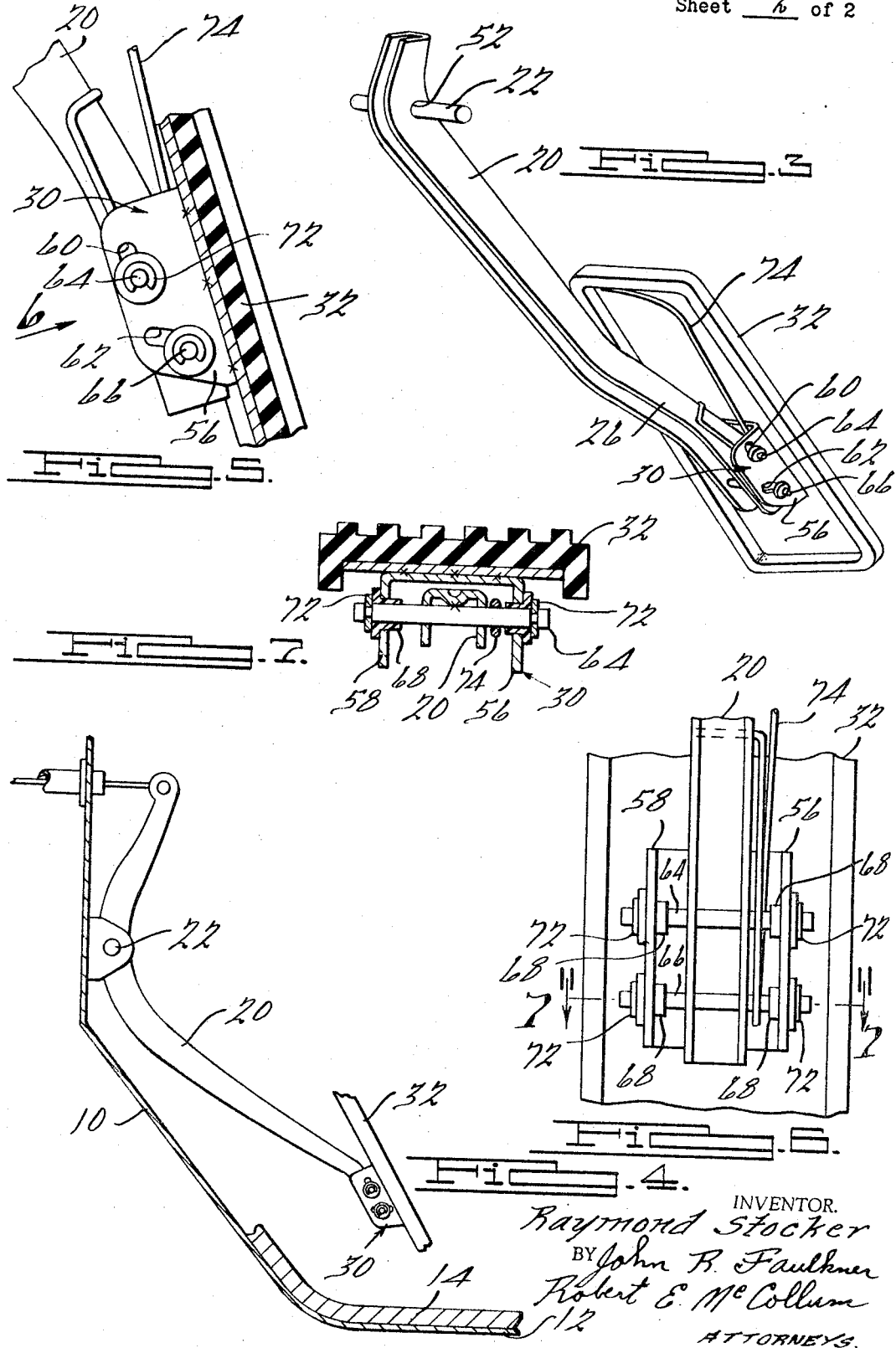

3,446,091
SUSPENDED ACCELERATOR PEDAL ASSEMBLY
Raymond Stocker, Oak Park, Mich., assignor to Ford Motor Company, Dearborn, Mich., a corporation of Delaware
Filed Aug. 22, 1967, Ser. No. 662,365
Int. Cl. G05g 1/04
U.S. Cl. 74—513          5 Claims

ABSTRACT OF THE DISCLOSURE

A suspended accelerator pedal system geometry in which the pedal is interconnected to the engine throttle linkage by a bracket having two spaced lost motion slots receiving pins mounted on the linkage, one pin serving as the pivot for the pedal, the other camming the pedal to slide up or down relative to the operator's foot as the pedal is depressed to provide the desired force to maintain comfortable and positive operation.

---

This invention relates, in general, to a motor vehicle accelerator pedal assembly. More particularly, it relates to a suspended type accelerator pedal design providing desired scrub action, and one eliminating the initial lost motion feel experienced by drivers whose foot pressure is above the pedal pivot on a free pivoting pedal.

The single pivot suspended accelerator pedal designs as used in some passenger cars do not provide the desired scrub action between the pedal and the driver's foot. Scrub action is the sliding motion that occurs between the pedal and the foot as the pedal is depressed, and is classed as positive or negative.

Positive scrub is objectionable and is produced by the pedal moving up the sole of the operator's shoe as it is being depressed. This condition has the tendency to lift the foot and reposition the heel forward of the natural heel pivot point. The repositioning can reoccur each time the pedal is depressed until the heel of the foot is uncomfortably too far forward. Positive scrub pedal geometry is the result of the pedal travel occurring too near the bottom of its lever arc. This occurrence is more inherent with the cable type of accelerator control since the pedal lever pivot in this case is usually located inside of the dash, more nearly over the pedal. To provide zero or negative scrub, the pedal lever generally would have to be shortened to a point where it would adversely affect the pedal travel and the overall mechanical advantage of the system. To redesign the known single pivot pedal for the desired scrub, therefore, can result in the sacrificing of good design of the basic geometry of the accelerator control system.

Negative scrub is produced by the pedal pushing down on the foot as it is being depressed. This condition has the tendency to hold the heel at the natural heel pivot point. Negative scrub is more inherent in the linkage type of accelerator controls since the pedal lever pivot point is usually located ahead of the dash. As a result, the pedal travel arc is more rearward of the lever pivot, producing a natural negative scrub condition. If, however, the negative scrub is too great, it can cause an uncomfortable condition. To reduce negative scrub, again the pedal travel and the overall mechanical advantage may be affected adversely.

Some negative scrub is desirable since some drivers prefer to place their heel rearwardly of the theoretical heel point. This reduces the negative scrub effect or makes it positive due to the much quicker falling off of the foot arc.

The invention provides a satisfactory accelerator pedal control system geometry while providing the desired pedal scrub.

Another feature of the invention is directed towards eliminating the initial lost motion feel experienced by drivers whose foot pressure point is above the pedal pivot on a free pivoting pedal. This lost motion feel, as well as the resulting bottom edge of the pedal hitting the instep of the foot, is objectionable to some drivers.

Moving the pedal pivot up as a means of reducing the possibility of the lost motion feel on the free pivoting pedal can produce undesirable conditions for a small footed driver. First, it can make the pivoting feature of the pedal ineffective. Second, it restricts the freedom of designing an optimum acceleration controls system. The resulting restrictions are reduced pedal travel and higher pedal efforts due to shortening of the pedal arm. Reduced pedal travel adversely effects optimum pedal modulation. Reducing the carburetor return spring force, to offset higher pedal efforts, reduces the idle return force, which can result in an off-idle sticking condition.

The invention also accomplishes the above by providing a satisfactory accelerator pedal control system geometry that eliminates the initial lost motion feel described.

The invention consists of pivotally mounting the accelerator pedal to the end of the throttle cable connected lever by a suitable bracket that is movable with the pedal and connected to the lever by two pin cam and cam follower slot connections that are so disposed as to positively force the pedal in the desired direction relative to the shoe, and without lost motion, as the lever swings about its pivot and the pedal pivots about the operator's heel pivot point.

Other features and advantages of the invention will become more apparent upon reference to the succeeding detailed description thereof, and to the drawings illustrating the preferred embodiments thereof; wherein, FIGURE 1 illustrates, diagrammatically, a side view of the prior art single pivot, suspended accelerator pedal assembly;

FIGURE 2 illustrates, diagrammatically, a side view of an accelerator pedal assembly embodying the invention;

FIGURE 3 is a perspective view of an accelerator pedal assembly constructed according to the invention;

FIGURE 4 is a reduced side elevational view of the FIGURE 2 illustration;

FIGURE 5 is an enlarged cross-sectional view of a detail of FIGURE 4;

FIGURE 6 is a bottom view of a portion of the pedal assembly shown in FIGURE 3;

FIGURE 7 is a cross-sectional view taken on a plane indicated by and viewed in the direction of the arrows 7—7 of FIGURE 6;

FIGURE 8 is a diagrammatic view illustrating the operation of the invention when the foot pressure is applied above the pedal pivot point; and, FIGURE 9 is a diagrammatic view of a modification of the invention.

FIGURE 1 illustrates diagrammatically the known state of the art as it pertains to single pivot, suspended accelerator pedal assemblies. The figure shows a portion of the passenger compartment of a motor vehicle, including the conventional firewall 10, the floor pan 12, and a floormat 14. In this case, the accelerator pedal assembly is connected to the vehicle carburetor throttle plate linkage by a cable 16 extending through the firewall for connection to the end 18 of a bell crank type link or lever 20. This latter lever is pivotally mounted at 22 on a bracket 24 fixed to firewall 10, in a known manner. Lever 20 extends downwardly and has a bent or angled lower end portion 26 that is pivotally connected at 28 to bracket 30 fixedly secured to an accelerator pedal 32. The operator's foot or shoe, represented at 34, has the heel edge 36 resting on the floormat and constituting a pivot for swinging movement of pedal 32. The points 38 and 40 represent, respectively, the common points of contact of the sole of the shoe with the pedal, and that of the pedal with the shoe, at idle position of the pedal.

It will be observed that as lever 20 pivots about fulcrum 22, point 28 will move along an arc 42. It will also be seen that the shoe contact point 38 tries to move along an arc 44 about heel pivot point 36 while at the same time trying to pivot counterclockwise about pivot 28. Since pivot 28 must follow the arc 42, the pedal contact point 40 will move upwardly relative to shoe contact point 38 so that when the pedal arrives at wide-open throttle position 46, the pedal will have moved up on the foot the distance indicated at 48. This latter distance is the positive scrub that lifts the shoe and causes a repositioning of the heel of the operator forward of its original position. Although the lever pedal pivot arc 42 is moving down as the pedal wide-open throttle position is approached, the pedal is also being rotated counterclockwise about pivot 28, causing point 38 to move up and thus reduce the downward travel effect of pivot 28.

If link pivot 22 were located forward of the dash panel or firewall, at the point indicated in FIGURE 1 at 50, the rate of fall off of pedal pivot arc 42′ now would be greater, and usually would be sufficient to offset the upward movement effect of point 40 on the pedal. The forward mounting of lever pivot 50 ahead of the dash or firewall usually will produce a natural negative scrub condition. However, the forward mounting of the link pivot is not always practical since generally it interferes with other components in the vehicle engine compartment.

Therefore, it will be seen that it is desirable to provide a suspended accelerator pedal control system geometry that permits mounting of the accelerator pedal linkage inside of the firewall; that is, in the passenger compartment of the vehicle, and with the desired scrub action.

FIGURE 2 illustrates, diagrammatically, and FIGURES 3–7 more in detail, one embodiment of the invention providing the above desired action with an accelerator pedal assembly that is mounted inside the firewall. More specifically, lever 20, which essentially is a U-shaped stamping, has adjacent its upper end a pivot pin 22 that has a press fit through suitable aligned openings 52. The lower end 26 of lever 20 is nested within the channel of an essentially U-shaped bracket 30 that is fixedly secured as by welding to the underside of accelerator pedal 32. The projecting legs or side walls 56 and 58 of bracket 30 each have a pair of spaced cam follower slots 60 and 62 that are adapted, respectively, to receive the ends of a pair of spaced pins 64 and 66 projecting through and fixedly secured to the end of lever 20, in the manner shown in FIGURE 7. In this case, the pins project outwardly beyond lever 20, through bushings 68 inserted in the cam follower slots in the legs of the bracket, and are held in place by suitable lock washers 72.

A pedal return spring 74 at one end is wrapped around the lower portion of lever 20, and bears against the underside of pedal 32 to normally bias the pedal and lever 20 apart to the positions indicated in FIGURES 3 and 4.

As best seen in FIGURES 2, 3, and 5, the upper cam follower slot 60 extends essentially parallel to the longitudinal axis of pedal 32, and is essentially parallel to the general longitudinal axis of the lower portion 26 of lever 20 when the lever is swung to the wide-open throttle position 46. Cam follower slot 62, on the other hand, extends at an angle both to the axis of cam follower slot 60 and to the longitudinal axis of pedal 32, as well as to the general direction of extension of lever 20.

Upper pin 64 acts as the pivot for movement of pedal 32 about link 20, and rides vertically in the cam follower slot 60. The pin 66, on the other hand, acts, in this case, to cam pedal 32 downwardly relative to lever 20, as the lever moves counterclockwise toward the wide-open throttle position 46 when accelerator pedal 32 is depressed by the shoe of the vehicle operator. Since pin 66 is secured to lever 20, any pivotal counterclockwise movement of pedal 32 about pin 64 will force the cam follower slot 62 and bracket 30 to move downwardly relative to pin 64. This provides the downward pedal movement producing the desired negative scrub action to cancel or counterbalance the natural positive scrub action of a single pivot, suspended accelerator pedal type assembly.

More specifically, referring to the diagrammatic arrangement of FIGURE 2, it will be seen that as pedal 32 is moved counterclockwise by the shoe of the operator about the heel pivot point 36, that the arcuate movement of pin 64 will cause the bracket 30 to move downwardly relative to shoe 34 as the pedal and link 20 move towards the wide-open throttle position. Thus, it will be seen that a downward movement of pedal 32 causes the pedal contact point 40 and the shoe contact point 38 to follow substantially the same arc as the pivot point 28 of link or lever 20. Therefore, there is essentially zero scrub with this geometry; that is, positive scrub is cancelled by the offset of the cam follower slot 62. The direction and shape of cam follower slot 62 will, of course, be dictated by the pedal scrub desired, and the desired scrub is obtained without having to change the basic geometry of the accelerator control systems shown in FIGURE 1. Rotating the cam counterclockwise produces pedal action in the positive direction for reducing excessive negative scrub. The length of slide slot 60 and the position of its pin 64 are, of course, dictated by the action produced by the cam follower slot 62.

FIGURE 8 illustrates how the invention also eliminates the initial lost motion feel that usually occurs when the foot pressure of the operator is applied above the pedal pivot point, instead of as shown in FIGURE 2. In the conventional single pivot, suspended pedal design shown in FIGURE 1, if the foot pressure is applied above point 38, as at 38′ in FIGURE 8, the pedal initially would pivot freely about pivot point 28 (FIGURE 1) without moving lever 20 until the lower end of pedal 32 is stopped by the arched portion of the shoe. In the FIGURES 2–8 design, however, the shape of lower slot 62 is such that initial counterclockwise pivotal movement of the pedal about the pivot pin 64′ is resisted by the cam surface of the bracket slot 62 as the bracket attempts to move rightwardly essentially at right angles to the initial position of the pedal. The slot curvature is made such that this initial resistance is greater than the force resistance due to the carburetor throttle return spring and the pedal return spring force, so that pedal 32 will move lever 20 simultaneous with its depression. Thus the lost motion feel is eliminated. Subsequently, of course, the pedal will pivot counterclockwise and the bracket 30 will move downwardly, in the manner already described in connection with the FIGURES 2–7 embodiment, to provide a negative scrub action.

FIGURE 9 illustrates a design shape for the lower cam follower slot that would be for use, for example, with a pedal system that has a naturally negative scrub. In this case, depression of the accelerator pedal will force the pedal upwardly relative to the shoe, producing positive scrub. The degree of positive scrub will, of course, be controlled by the shape of the slot, and would in most cases only be sufficient to cancel a portion of the naturally negative scrub system so as to provide a resultant zero scrub or only slightly negative scrub, as desired.

From the foregoing, therefore, it will be seen that the invention provides a suspended accelerator pedal control system geometry that provides the desired scrub action while eliminating initial lost motion feeling and maintaining a satisfactory accelerator pedal control system geometry.

What is claimed is:

1. A suspended accelerator pedal assembly comprising an essentially vertically disposed link pivotally mounted adjacent its upper end to a stationary support adjacent the passenger compartment of a motor vehicle, a longitudinally extending accelerator pedal, and means pivotally mounting said pedal to the lower portion of said link for concurrent movement of said pedal and link at all times and for a limited combination movement of said pedal in the generally longitudinal direction of said pedal and a concurrent pivotal movement of said pedal relative to said link, said means comprising a pair of pin and elongated slot connections spaced along the longitudinal extent of said pedal between said pedal and link restricting movement of said pedal relative to said link.

2. An assembly as in claim 1, said connections each comprising a pin cam fixed to one of said link and pedal and bracket means fixedly projecting from the other of said link and pedal, said bracket means having a pair of spaced cam follower slots each receiving one of said pin cams therein.

3. An assembly as in claim 2, said slots extending in different directions, the longitudinal axis one of said slots extending at an angle to the longitudinal axis of said link portion connected to said pedal.

4. An assembly as in claim 2, one of said slots extending in one direction, the other of said pair of slots extending in the opposite direction.

5. An assembly as in claim 4, one of said slots being disposed essentially parallel to the longitudinal axis of said pedal, the other of said slots extending at an angle to the pedal longitudinal axis, whereby pivotal movement of said link about its pivot and said pedal about a separate axis remote from the end of said lever effects an essentially vertical movement of said pedal relative to said link by the essentially vertical movement of said slots on said pins.

References Cited

UNITED STATES PATENTS

| 2,628,507 | 2/1953 | Juergens | 74—513 |
| 2,722,847 | 11/1955 | Petrochko | 74—560 XR |
| 2,915,916 | 12/1959 | Hinsey et al. | 74—512 XR |
| 2,936,867 | 5/1960 | Perry | 74—513 XR |
| 3,275,094 | 9/1966 | Kennedy | 74—560 XR |

FRED C. MATTERN, JR., *Primary Examiner.*

JAMES A. WONG, *Assistant Examiner.*

U.S. Cl. X.R.

74—560